Patented Aug. 19, 1952

2,607,796

UNITED STATES PATENT OFFICE 2,607,796

CRYSTALLINE ISOMER OF ALLETHRIN

Milton S. Schechter, Washington, D. C., and Frederick B. La Forge, Arlington, Va.

No Drawing. Application August 3, 1951, Serial No. 240,262

11 Claims. (Cl. 260—468)

(Granted under the act of March 3, 1883, as amended April 30, 1928; 370 O. G. 757)

ALLETHRIN STEREOISOMERIC PRODUCTS AND PROCESSES

The invention herein described may be manufactured and used by or for the Government of the United States of America for governmental purposes throughout the world without the payment to us of any royalty thereon.

This invention relates to preparation of stereoisomeric products from allethrin or allethrin-like compositions.

We hereby dedicate the invention herein described to the free use of the people in the territory of the United States to take effect on the granting of a patent to us.

In our prior applications Serial Numbers 75,282, filed February 8, 1949; 161,481, filed May 11, 1950; and 168,142, filed June 14, 1950; we describe processes for synthesizing dl-2-allyl-4-hydroxy-3-methyl-2-cyclopenten-1-one by ring closing the hydroxydiketone therein disclosed, and for esterifying it with a synthetic racemic chrysanthemum carboxylic acid acylating agent to form an analogue of pyrethrins.

An object of this invention is to recover from allethrin, as it is produced by our syntheses, or by the syntheses of others, a crystalline racemic form useful as a chemical and biological reference standard.

When dl-2-allyl-4-hydroxy-3-methyl-2-cyclopenten-1-one is acylated with a mixture of dl-cis- and dl-trans-chrysanthemum monocarboxylic acid chlorides, as disclosed in said prior applications, a very useful, highly insecticidal mixture of esters is produced which has been named "allethrin." Allethrin has a rapid knock-down effect and high killing power similar to the pyrethrins against houseflies and some other insects. It is now being manufactured commercially.

Allethrin, as so produced, is a mixture of eight isomers. To describe these isomers, certain abbreviations will be employed as follows: dl-2-allyl-4-hydroxy-3-methyl-2-cyclopenten-1-one will be called dl-allethrolone and its optically active forms will be called d-allethrolone and l-allethrolone. The dl-cis- and dl-trans-chrysanthemum monocarboxylic acids will be called dl-cis-CMA and dl-trans-CMA respectively, and the optically active forms will be called d-cis-CMA, l-cis-CMA, d-trans-CMA and l-trans-CMA.

The eight isomers present in allethrin may be designated as follows:

(a) d-Cis-CMA ester with d-allethrolone.
(b) d-Cis-CMA ester with l-allethrolone.
(c) l-Cis-CMA ester with d-allethrolone.
(d) l-Cis-CMA ester with l-allethrolone.
(e) d-Trans-CMA ester with d-allethrolone.
(f) d-Trans-CMA ester with l-allethrolone.
(g) l-Trans-CMA ester with d-allethrolone.
(h) l-Trans-CMA ester with l-allethrolone.

Allethrin as produced commercially is optically inactive, hence, isomers $a$, $b$, $c$ and $d$ are present in equal amounts. Likewise, isomers $e$, $f$, $g$ and $h$ are present in equal amounts. However, since the dl-cis-CMA and dl-trans-CMA may not necessarily be used in equal amounts to prepare allethrin, the total amount of esters $a$, $b$, $c$ and $d$ may not be equal to the total amount of esters $e$, $f$, $g$ and $h$. Hereinafter, a mixture of equal amounts of esters $a$, $b$, $c$, and $d$ will be called dl-cis-CMA ester with dl-allethrolone; a mixture of equal amounts of esters $e$, $f$, $g$, and $h$ will be called, dl-trans-CMA ester with dl-allethrolone.

After having distilled some allethrin in a molecular still in order to purify it, it was noticed that upon cooling some to a low temperature, about —15° C., in an acetone-Dry Ice bath, part of the allethrin crystallized. This crystallization was also effected by cooling to a low temperature a concentrated solution of allethrin dissolved in solvents such as low-boiling petroleum ether or isooctane. The crystals were filtered off and washed with cold isooctane on a filter funnel which was kept cold by means of a jacket filled with a cooling medium. The crystals were recrystallized by dissolving in isooctane, cooling to a low temperature, filtering at a low temperature and washing with cold isooctane. When so purified, and dried, the colorless crystals had a melting point of 50-51° C.

This crystalline isomer of allethrin was shown to be an ester of dl-trans-CMA by saponification of the ester and identification of the dl-trans-CMA, as follows: One gram of this crystalline isomer was saponified by refluxing with 20 ml. of 0.5 N ethanolic sodium hydroxide solution for one hour, the ethanol was largely removed by heating on the steam bath and the residue dissolved in water and extracted with ether to remove neutral material. The aqueous layer was separated, acidified with dilute sulfuric acid, extracted with ether and the ether layer was separated, dried and the solvent evaporated. The residue was dissolved in low-boiling petroleum ether and some impurity filtered off. The filtrate was evaporated and the residue was recrystallized from nitromethane giving crystals melting at 55–56° C. which were proved to be identical with dl-trans-chrysanthemum monocarboxylic acid by the melting point and absence of any depression in a mixture melting point determination with authentic dl-trans-chrysanthemum monocarboxylic acid. It should be noted that dl-cis-chrysanthemum monocarboxylic acid melts much higher, i. e., at 115–116°.

The crystalline isomer was again proven to be an ester of dl-trans-CMA by a second method of proof. The dl-allethrolone was acylated with the acid chlorides of dl-cis-CMA and dl-trans-CMA and the respective esters were distilled in high vacuum. The dl-cis-CMA ester with dl-allethrolone had a boiling point of 146–149° at 0.4 mm. and $n_D^{25}$ 1.5070. The dl-trans-CMA ester with dl-allethrolone had a boiling point of 147–150° at 0.4 mm. and $n_D^{25}$ 1.5047. These esters were cooled and seeded with a few crystals of the crystalline isomer of M. P. 50–51° C. The dl-cis-CMA ester with dl-allethrolone could not thus be induced to crystallize but the dl-trans-CMA ester with dl-allethrolone did crystallize in part upon being cooled and seeded. The dl-trans-CMA ester with dl-allethrolone was dissolved in isooctane, cooled, seeded, and permitted to crystallize. The crystals were filtered cold, washed with cold isooctane, and dried; the melting point of the crystals was 50–51° C. There was no depression in a mixture melting point of the latter with the crystalline allethrin isomer originally obtained from allethrin.

Since only optically inactive or racemic forms can be crystallized from optically inactive allethrin or from the dl-trans-CMA ester with dl-allethrolone, the crystalline allethrin isomer M. P. 50–51° C. may consist either of equal parts of isomers $e$ and $h$, or of equal parts of isomers $f$ and $g$. It should be possible to decide between these two alternatives by determining which pair ($e$ and $h$ or $f$ and $g$) of the individually prepared esters, $e$, $f$, $g$, and $h$, would give a crystalline product identical with the crystalline isomer already isolated having a M. P. of 50–51°. Until this is done, it is proposed that the crystalline allerthrin isomer of M. P. 50–51° which we have isolated be named the alpha-dl-trans-isomer of allethrin. The other optically inactive isomer which would be found concentrated in the filtrate of the dl-trans-CMA ester with dl-allethrolone after the crystalline alpha-dl-trans-isomer of allethrin had been removed, we propose to call the beta-dl-trans-isomer of allethrin. The dl-trans-CMA ester with dl-allethrolone consists of equal parts of the alpha- and beta-dl-trans-isomers of allethrin.

There are four optically inactive forms of allethrin isomers that might possibly crystallize from allethrin, namely, the alpha-dl-trans-isomer of allethrin, the beta-dl-trans-isomer of allethrin, and two corresponding dl-cis-isomers of allethrin. Although there is evidence that one or more of the other isomers of allethrin crystallize out when kept in concentrated isooctane solution in an acetone-Dry Ice bath, only the above-described alpha-dl-trans-isomer of allethrin seems to have a melting point above room temperature, i. e. at 50–51°. Such other isomers as might crystallize out at very low temperatures, melt before reaching room temperature.

The crystalline alpha-dl-trans-isomer of allethrin has a high insecticidal activity and high knockdown power towards house flies and should serve as a useful biological reference standard in insecticidal tests such as in the Peet-Grady method of testing insecticides. For many years, a standardized solution of pyrethrins in purified kerosene, commonly referred to as the Official Test Insecticide of the Chemical Specialties Manufacturers Association, has been employed as a reference standard in Peet-Grady and other types of insecticide tests. There are difficulties in analyzing and standardizing the pyrethrins for such use because the pyrethrins are mixtures of at least four insecticidally active ingredients derived from natural sources. The alpha-dl-trans-isomer of allethrin can be obtained as a pure, crystalline substance and should serve as an excellent biological standard. It may also be useful as a pure standard for checking chemical analytical methods for substances of the pyrethrin or allethrin type. Further advantages of the crystalline compound are ease of handling and shipping.

Another object of this invention is to increase the insecticidal activity of mixtures of allethrin isomers. Since the crystalline alpha-dl-trans-isomer of allethrin seems, according to our tests, to have a somewhat lower toxicity toward house-flies than either allethrin or the beta-dl-trans-isomer of allethrin, it is possible to increase the insecticidal activity of allethrin or of the dl-trans-CMA ester with dl-allethrolone by crystallizing out any alpha-dl-trans-isomer of allethrin and filtering it off from the ester mixtures, or from their solutions in a solvent such as isooctane, at low temperature.

The preferred low temperature range for separating the crystalline alpha-dl-trans-isomer of allethrin in our process is from about 10° C. down to about minus 40° C.

Two examples of the preparation of crystalline alpha-dl-trans-isomer of allethrin are as follows:

EXAMPLE 1

About 60 g. of allethrin obtained as disclosed in our prior applications was dissolved in about 60 ml. of isooctane and was cooled in the freezing compartment of a refrigerator. After seeding with a few crystals of the alpha-dl-trans-isomer of allethrin (obtained by cooling some allethrin dissolved in isooctane in an acetone-Dry Ice bath) it was allowed to stand in the freezing compartment (about —15° C.) until crystallization was complete. The crystals were filtered off in a glass filter funnel having a sintered glass filter disc, the funnel being cooled by means of a cooling jacket filled with isooctane cooled to about minus 15° C. by the addition of Dry Ice from time to time. During the vacuum filtration, the crystals in the funnel were protected from moisture by means of a stopper carrying a calcium chloride-filled drying tube. The crystals were washed twice with small portions of isooctane which had been cooled in an acetone-Dry Ice bath. After drying in vacuo, the crystals weighed about 10.2 g. and had M. P. 49–50°. The crystals were recrystallized by dissolving in isooctane, cooling and filtering in the same manner as described above. The pure, colorless alpha-dl-trans-isomer of allethrin crystals had a melting point of 50–51° and were analyzed after having been dried in vacuo over phosphorous pentoxide in an Abderhalden drier.

Analysis: calculated for $C_{19}H_{26}O_3$: C, 75.46%; H, 8.67%. Found: C, 75.41%; H, 8.67%.

It will be noted that in Example 1 above the allethrin material employed contained the eight isomers listed above, being a product prepared by esterifying with the mixture of synthetic dl-cis- and dl-trans-chrysanthemum monocarboxylic acid halides.

In the following Example 2, the material employed is prepared by esterifying the cyclopentenolone with dl-trans-chrysanthemum monocarboxylic acid halide. Consequently there are no dl-cis moieties involved.

EXAMPLE 2

Eight and four tenths grams of the dl-trans-CMA ester with dl-allethrolone (which had a boiling point of 147–150° at 0.4 mm. and $n_D^{25}$ 1.5047), prepared by the processes of our prior applications, was dissolved in 12.6 ml. of isooctane and was cooled in the freezing compartment of the refrigerator to about −15° C. After seeding with a few crystals of the alpha-dl-trans-isomer of allethrin it was allowed to stand in the freezing compartment until crystallization was complete. The crystals were filtered off in a glass filter funnel having a sintered glass filter disc, the funnel being cooled by means of a cooling jacket filled with isooctane cooled to about minus 30° C. by the addition of Dry Ice from time to time. During the vacuum filtration, the crystals in the funnel were protected from moisture by means of a stopper carrying a calcium chloride-filled drying tube. The solvent was removed from the filtrate in vacuo leaving 4.4 g. of oil, $n_D^{25}$ 1.5050. This oil consists almost entirely of the beta-dl-trans-isomer of allethrin with only about 5% of the alpha-dl-trans-isomer of allethrin dissolved in it, and is the substance referred to as the beta-dl-trans-isomer of allethrin in insecticidal tests in Tables I and II.

The crystalline portion was recrystallized from isooctane in the manner described in Example 1 giving a product which had a melting point of 50–51° C. and which gave no depression in a mixture melting point determination with the pure alpha-dl-trans-isomer of allethrin of Example 1.

This invention is not to be construed as being limited to the solvents and conditions described in the examples. Other solvents, temperatures, and modes of filtration or centrifugation may also be employed as should be evident to those skilled in the art.

Insecticidal tests of materials pertaining to this invention are given in Tables I and II. It is evident that although the alpha-dl-trans-isomer of allethrin is somewhat inferior to allethrin in tests against houseflies, the beta-dl-trans-isomer of allethrin is superior to allethrin. Since there is considerable specificity in biological tests with insecticides it is possible that the alpha-dl-thrans-isomer of allethrin might prove to be superior to allethrin against some species of insects other than houseflies.

The alpha-dl-trans- and beta-dl-trans-isomers of allethrin may be formulated for insecticidal or insect-repellent applications in various ways known to those skilled in the art, for use as dusts, sprays, aerosols, as emulsions, in kerosene, or in other organic solvents. They may also be used in formulations with synergists, or with other insecticides such as DDT, benzene hexachloride, rotenone, and chlordane.

Table I.—Toxicity tests to house flies (Musca domestica) by turntable method

| Material | Concentration[1] | Knockdown in 25 Minutes[2] | Kill in One Day[2] |
|---|---|---|---|
| | Mg./ml. | Percent | Percent |
| alpha-dl-trans-Isomer of allethrin, M. P. 50–51° C. | 8 | 99 | 92 |
| alpha-dl-trans-Isomer of allethrin, M. P. 50–51° C. | 4 | 100 | 64 |
| alpha-dl-trans-Isomer of allethrin, M. P. 50–51° C. | 2 | 99 | 22 |
| alpha-dl-trans-Isomer of allethrin, M. P. 50–51° C. | 1 | 93 | 8 |
| beta-dl-trans-Isomer of allethrin. | 2 | 100 | 87 |
| beta-dl-trans-Isomer of allethrin. | 1 | 100 | 71 |
| beta-dl-trans-Isomer of allethrin. | 0.5 | 99 | 40 |
| beta-dl-trans-Isomer of allethrin. | 0.25 | 98 | 10 |
| Allethrin | 2 | 100 | 75 |
| Allethrin | 1 | 100 | 46 |
| Allethrin | 0.5 | 99 | 15 |
| Allethrin | 0.25 | 87 | 5 |
| Pyrethrins | 8 | 100 | 95 |
| Pyrethrins | 4 | 100 | 75 |
| Pyrethrins | 2 | 100 | 46 |
| Pyrethrins | 1 | 100 | 17 |

[1] Solutions were prepared in refined kerosene (Deobase).
[2] Results are the average of four tests at each concentration.

Table II.—Effectiveness against house flies (Musca domestica) of sprays containing alpha-dl-trans- and beta-dl-trans-isomers of allethrin. All materials were tested at a concentration of 2 mg./ml. in refined kerosene (Deobase). Results are the average of four tests each by the Peet-Grady method

| Material | Knockdown | | Kill in One Day |
|---|---|---|---|
| | 5 minutes | 10 minutes | |
| | Percent | Percent | Percent |
| alpha-dl-trans-Isomer of allethrin, M. P. 50–51° C. | 68 | 90 | 14 |
| beta-dl-trans-Isomer of allethrin | 95 | 99 | 74 |
| Allethrin | 94 | 99 | 63 |
| Pyrethrins | 96 | 99 | 38 |

Having thus described our invention, we claim:

1. A process comprising cooling to below about 10° C. the esters of dl-2-allyl-4-hydroxy-3-methyl-2-cyclopenten-1-one with dl-chrysanthemum monocarboxylic acid, the dl-chrysanthemum acid being at least in part the trans acid, to crystallize the alpha-dl-trans-isomer, namely, the dl-trans-chrysanthemum monocarboxylic acid ester of said hydroxycyclopentenone, having a melting point when purified of about 50–51° C., and separating the crystals.

2. A process comprising cooling to below about 10° C. dl-trans-chrysanthemum monocarboxylic acid esters of dl-2-allyl-4-hydroxy-3-methyl-2-cyclopenten-1-one dissolved in an inert organic liquid solvent to crystallize out the alpha-dl-trans-isomer of allethrin having a melting point of about 50–51° C. when purified, removing the crystals, and thereafter distilling off the solvent leaving a residual oil comprising beta-dl-trans-isomer of allethrin.

3. Crystalline dl-trans-chrysanthemum monocarboxylic acid ester of dl-2-allyl-4-hydroxy-3-methyl-2-cyclopenten-1-one having a melting point of about 50–51° C.

4. A process comprising cooling a composition essentially consisting of dl-cis and dl-trans-chrysanthemum monocarboxylic acid esters of dl-2-allyl-4-hydroxy-3-methyl-2-cyclopenten-1- one, to a temperature below room temperature to crystallize the dl-trans-chrysanthemum monocarboxylic acid ester of dl-2-allyl-4-hydroxy-3-methyl-2-cyclopenten-1-one, said esters having a melting point of about 50–51° C. when purified, and separating the crystals.

5. A process comprising cooling a mixture of dl-cis and dl-trans-chrysanthemum monocarboxylic acid esters of dl-2-allyl-4-hydroxy-3-methyl-2-cyclopenten-1-one, dissolved in an inert organic solvent to a temperature below room temperature to crystallize the dl-trans-chrysanthemum monocarboxylic acid ester of dl-2-allyl-4-hydroxy-3-methyl-2-cyclopenten-1-one, said ester having a melting point of about 50–51° C. when purified, and separating the crystals, said solution of the mixture being seeded with crystals of said ester.

6. A process comprising cooling a mixture of dl-cis and dl-trans-chrysanthemum monocarboxylic acid esters of dl-2-allyl-4-hydroxy-3-methyl-2-cyclopenten-1-one, to a temperature sufficiently below room temperature to crystallize the dl-trans-chrysanthemum monocarboxylic acid ester of dl-2-allyl-4-hydroxy-3-methyl-2-cyclopenten-1-one, said ester having a melting point of about 50–51° C. when purified, and separating the crystals, said cooling being in the range of plus 10° C. to minus 40° C.

7. A process comprising cooling a mixture of dl-cis- and dl-trans-chrysanthemum monocarboxylic acid esters of dl-2-allyl-4-hydroxy-3-methyl-2-cyclopenten-1-one, dissolved in isooctane, to a temperature sufficiently below room temperature to crystallize the dl-trans-chrysanthemum monocarboxylic acid ester of dl-2-allyl-4-hydroxy-3-methyl-2-cyclopenten-1-one, said ester having a melting point of about 50–51° C. when purified, and separating the crystals, the cooling being to a temperature in the range minus 15° C. to minus 40° C., the crystals being removed from the cold solvent and recrystallized from isooctane.

8. A process comprising cooling a composition essentially consisting of dl-cis- and dl-trans-chrysanthemum monocarboxylic acid esters of dl-2-allyl-4-hydroxy-3-methyl-2-cyclopenten-1-one, dissolved in an inert liquid hydrocarbon solvent to a temperature below room temperature to crystallize the dl-trans-chrysanthemum monocarboxylic acid ester of dl-2-allyl-4-hydroxy-3-methyl-2-cyclopenten-1-one, said ester having a melting point of about 50–51° C. when purified, and separating the crystals, said solution having been seeded with crystals of said ester.

9. The process of claim 8 in which the solvent is isooctane.

10. The process of claim 2 in which the solvent is taken from the group consisting of isooctane and low boiling petroleum ether.

11. The process of claim 2 in which the solvent is isooctane.

MILTON S. SCHECHTER.
FREDERICK B. LA FORGE.

No references cited.